United States Patent [19]

Gross et al.

[11] Patent Number: 4,983,641

[45] Date of Patent: Jan. 8, 1991

[54] METHOD FOR CONTROLLING THE CURE RATE OF SILICONE FOAM

[75] Inventors: David C. Gross, Schenectady; Donald S. Johnson, Scotia, both of N.Y.; Connie H. Shannon, Evansville, Ind.

[73] Assignee: General Electric Company, Waterford, N.Y.

[21] Appl. No.: 503,183

[22] Filed: Apr. 2, 1990

[51] Int. Cl.$^5$ ............................................. C08J 9/00
[52] U.S. Cl. ............................... 521/82; 521/88; 521/117; 521/154
[58] Field of Search ................... 521/82, 88, 117, 154

[56] References Cited

U.S. PATENT DOCUMENTS

| | | | |
|---|---|---|---|
| 4,418,157 | 11/1983 | Modic | 521/154 |
| 4,851,452 | 7/1989 | Gross et al. | 521/154 |
| 4,879,317 | 11/1989 | Smith et al. | 521/154 |

Primary Examiner—Morton Foelak

[57] ABSTRACT

A method is provided for controlling the cure time of a platinum-catalyzed addition cured silicone foamable composition, comprising the step of adding to the composition an aqueous buffer solution having a pH of about 2 to about 10, wherein cure time is increased if the pH of the buffer solution is higher than the pH of the composition prior to the addition thereto of the buffer solution and decreased if the pH of the buffer solution is lower than the pH of the composition prior to the addition thereto of the buffer solution.

32 Claims, No Drawings

METHOD FOR CONTROLLING THE CURE RATE OF SILICONE FOAM

BACKGROUND OF THE INVENTION

The present invention relates to the cure rate of SiH-olefin platinum catalyzed addition-cured compositions. More particularly, the present invention relates to a method for controlling the cure rate of SiH-olefin platinum catalyzed silicone foam compositions.

Silicone foam compositions are known in the art. Reference may be made, for example, to U.S. Pat. Nos. 4,189,545; 3,923,705; 4,599,367, and 3,436,366.

Silicone foam is generally prepared from foamable compositions containing a vinyl-containing siloxane, a hydride containing siloxane, a hydroxyl source, and a platinum catalyst. These compositions undergo cure to form foam. The term "cure time" refers to the time required for a foamable composition to become foam. Various applications of silicone foam compositions sometimes require increasing or decreasing cure times without sacrificing density or strength of the foam. Presently, cure speed is adjusted by varying the concentration of the vinyl polymer and the silane functionality in the foamable composition. This approach is impractical, however, because it requires adjusting the entire formulation depending on the end use of the foam.

Alternatively, cure speed can be adjusted by adjusting the level of catalyst used. This approach works well for achieving rapid cure but when the catalyst concentration is lowered to effect a cure time of 8 minutes, trace amounts of added amine, phosphine, or other base additives completely poison the platinum catalyst such that cure is not observed.

It is therefore an object of the present invention to provide a method for accurately controlling cure time of a silicone foam composition which does not require the adjustment of the entire formulation of the foam.

It is further an object of the present invention to provide a method for accurately controlling cure time which can tolerate the presence of an acidic or basic impurity.

These objects are achieved in the present invention.

SUMMARY OF THE INVENTION

The present invention is based on the discovery that the cure time of a platinum-catalyzed addition cured composition can be controlled by modifying the pH of the reaction medium.

This invention provides a method for controlling the cure time of a silicone foamable composition comprising by weight:
(A) a silicone composition comprising by weight:
  (1) 100 parts of a vinyl-terminated polydiorganosiloxane of the formula:

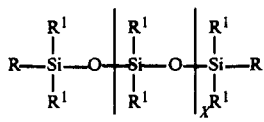

wherein R and $R^1$ are selected from the group consisting of substituted or unsubstituted hydrocarbon radicals of from 1 to 20 carbon atoms, such that the polymer contains from 0.0002 to 3% by weight vinyl and x varies such that the viscosity of the polymer varies from 100 to 1,000,000 centipoise at 25° C.;
  (2) about 25 to about 140 parts per million of a platinum catalyst;
  (3) about 1 to 200 parts by weight of a reinforcing or extending filler per hundred parts of foamable composition;
(B) 1 to 50 parts of a substantially linear hydride polysiloxane having the formula

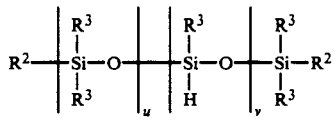

wherein $R^2$ is selected independently from the group consisting of hydrogen, alkyl radicals of from 1 to 8 carbon atoms, halo substituted alkyl radicals of from 1 to 8 carbon atoms, aryl radicals of from 6 to 14 carbon atoms, and halo substituted aryl radicals of from 6 to 14 carbon atoms; and $R^3$ is selected from the group consisting of alkyl radicals of from 1 to 8 carbon atoms, aryl radicals of from 6 to 14 carbon atoms, halo aryl radicals of from 6 to 14 carbon atoms, and fluoroalkyl radicals of from 3 8 carbon atoms; u and v are integers which can vary sufficiently to provide a hydride polysiloxane having a viscosity of from about 5 to about 10,000 centipoise at 25° C.; and
(C) about 0.1 to about 5 parts of a hydroxyl source selected from the group consisting of water, organic alcohol, or a mixture of the foregoing; comprising the step of adding to the composition an aqueous buffer solution having a pH of about 2 to about 10, wherein cure time is increased if the pH of the buffer solution is higher than the pH of the composition prior to the addition thereto of the buffer solution, and wherein cure time is decreased if the pH of the buffer solution is lower than the pH of the composition prior to the addition thereto of the buffer solution.

The cure time of a silicone foamable composition having the composition described above is increased by adding to the composition an aqueous buffer solution having a pH of about 2 to about 10, with the proviso that the pH of the buffer solution be higher than the pH of the composition prior to the addition thereto of the buffer solution.

The cure time of a silicone foamable composition having the composition described above is decreased by adding to the composition an aqueous buffer solution having a pH of about 2 to about 10, with the proviso that the pH of the buffer solution be lower than the pH of the composition prior to the addition thereto of the buffer solution.

Although the invention will be described with regard to silicone foam compositions, it is to be understood that the present invention can be applied to any platinum-catalyzed SiH-olefin addition cured composition.

DETAILED DESCRIPTION OF THE INVENTION

Buffer solutions useful in this invention include any of the standard aqueous buffer solutions known in the art for providing pH values in the range of 2 to 10. Suitable buffer solutions are disclosed, for example, in the CRC Handbook of Chemistry and Physics, 70th Edition, at page D-145, which is incorporated by reference herein.

For example, an aqueous buffer solution containing 25 ml of 0.2 molar KCl and 6.5 ml of 0.2 molar HCl can be used to provide a pH of 2. For a pH of 3, an aqueous solution containing 50 ml of 0.1 molar potassium hydrogen phthalate and 22.3 ml of 0.1 molar HCl can be used. For a pH of 4, an aqueous solution containing 50 ml of 0.1 molar potassium hydrogen phthalate and 0.1 ml of 0.1 molar HCl. For a pH of 5, an aqueous solution containing 50 ml of 0.1 molar potassium hydrogen phthalate and 22.6 ml of 0.1 molar NaOH can be used. An aqueous buffer solution containing 50 milliliters of 0.1 molar potassium dihydrogen phosphate and 5.6 milliliters of 0.1 molar NaOH can be used to provide a pH of 6.0. To obtain a pH of 7, 50 milliliters of 0.1 molar tris(hydroxymethyl) aminomethane and 46.6 milliliters of 0.1 molar HCl can be used as the buffer solution. For a pH of 8, 50 milliliters of 0.025 molar borax and 20.5 milliliters 0.1 molar HCl can be used. A buffer solution containing 50 milliliters of 0.025 molar borax and 4.6 milliliters of 0.1 molar HCl can be used to provide a pH of 9. A buffer solution containing 50 milliliters of 0.05 molar sodium bicarbonate and 10.7 milliliters of 0.1 molar NaOH will provide a pH of 10.

In preferred embodiments of the present invention, the buffer solution used to obtain pH values of 2 to 8.0 are aqueous phosphoric acid ester/potassium hydroxide buffer solutions, wherein the phosphoric acid ester has the formula $$R^3OPO_3H_2$$

wherein $R^3$ is a substituted or unsubstituted alkyl radical having about 1 to about 20 carbon atoms or a substituted or unsubstituted aryl radical having 6 to about 20 carbon atoms. Preferably, $R^3$ is an alkyl group having 10 or 12 carbon atoms, i.e., a decyl or dodecyl group.

Alternatively, it is possible to employ a siloxane substitute phosphoric acid ester such as:

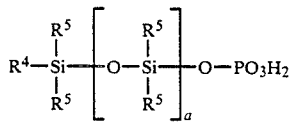

wherein $R^4$ and $R^5$ are selected from the group consisting of substituted or unsubstituted hydrocarbon radicals of from 1 to 20 carbon atoms, and a varies such that the viscosity of the polymer varies from 10 to 1000 centipoise at 25° C.

An organic radical or polymer can be used to couple the siloxane fragment to the phosphoric atom. These phosphoric acid esters can be represented as:

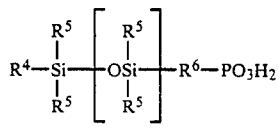

where $R^4$ and $R^5$ are defined as described above and $R^6$ = a substituted or unsubstituted hydrocarbon radical from 0 to 20 carbon atoms or an organic polymer such as a polyether represented by:

where $R^6$ is an organic radical defined as described above and b is an integer from 1 about 20.

It should be noted that cationic hydroxides other than KOH can be employed to adjust the buffer to the desired pH. For example, the remaining alkali metals, lithium and sodium, can be used. Organic hydroxides, such as the quaternary ammonium hydroxides:

$$NR_4^{5+}OH^-$$

where $R^5$ is defined as described above will change solubility in a non polar medium.

The phosphoric acid ester buffer solution is preferred because of its high solubility in silicone. However, above pH levels of about 8, its buffering capacity is no longer effective for purposes of the present invention.

It is to be understood by those skilled in the art that the concentration of buffer in the buffer solution should not be excessive as too high a buffer concentration may result in extremely rapid hydrogen gas evolution but no cure, eventually leading to the collapse of the rising foam under its own weight. What constitutes excessive buffer concentration for a particular buffer concentration for a particular buffer solution can be determined by simple experimentation by those skilled in the art.

Part (1) of Component A contains 100 parts of a vinyl-terminated polydiorganosiloxane having the general formula (I) above.

In formula (I) above, R and $R^1$ may be substituted or unsubstituted hydrocarbon radicals of from 1 to 20 carbon atoms with the proviso that there is controlled vinyl substitution and controlled viscosity. The vinyl substitution should range from about 0.0002 to 3% by weight and preferably, from about 0.001 to about 1% by weight. Viscosity should vary from about 100 to about 1,000,000 centipoise at 25° C. and preferably, from about 2500 to 500,000 centipoise. Although a polymer having a broader range of vinyl content will operate in the present invention, the more limited vinyl concentration given above will allow for a reaction that proceeds at an appropriate rate, that is not too slow and allows for proper cross-linking in the polymer to produce cured elastomeric silicone foam. With respect to the preferred range of viscosity, as can be appreciated, it is preferred that the viscosity not be too high, otherwise the composition is difficult to handle and will not foam well. The vinyl-containing polymer will form the major part of the foamable composition and thus the viscosity will be important to the viscosity of the final composition.

Substituted or unsubstituted hydrocarbon radicals of R and $R^1$ may be selected from alkyl radicals, methyl, ethyl, propyl, etc.; cycloalkyl radicals such as cyclohexyl, cycloheptyl, etc.; mononuclear aryl radicals such as phenyl, methyl phenyl, ethylphenyl, etc.; alkenyl radicals such as vinyl, allyl, etc. and more preferably vinyl and other well known substituent groups for diorganopolysiloxane polymers. Preferably the R and $R^1$ radicals are selected from the class consisting of alkyl radicals of 1 to 8 carbon atoms, aryl radicals such as phenyl; vinyl radicals and halogenated hydrocarbon atoms, such as, for instance 3,3,3-trifluoropropyl. Most phenyl radicals, vinyl radicals and 3,3,3-trifluoropropyl radicals where the polymer has the foregoing vinyl substitution and R is vinyl. Although vinyl-containing polysiloxane where the vinyl units appear only on the siloxane chain can be used to produce silicone foam, the physical properties are not as good as where there is terminal vinyl substitution. A particularly preferred polymer has only terminal vinyl substitution, i.e. where R is vinyl and $R^1$ is methyl, phenyl, and/or 3,3,3-trifluoropropyl.

Preferably, the vinyl-terminated polydiorganosiloxane is a vinyl-terminated polydimethylsiloxane.

Vinyl-containing polysiloxanes are well known in the art and may be produced by a variety of methods, for instance, by equilibrating cyclic polysiloxanes with or without vinyl substitution in the presence of appropriate amounts of vinyl substituted chainstopper. Further details for production of vinyl-substituted polysiloxanes may be found in U.S. Pat. No. 3,425,967 to Modic. Further suitable vinyl- containing polysiloxanes may be found in U.S. Pat. Nos. 4,599,367; 4,418,157 and 3,923,705, all of which are incorporated herein by reference.

Part (2) of component A contains about 25 to about 140 parts per million of a platinum catalyst. Suitable platinum catalysts include, for example, reaction products of an olefin and chloro platinic acid as described in Ashby, U.S. Pat. No. 3,159,601, or the reaction product of platinic chloride and cyclopropane as described in Ashby, U.S. Pat. No. 3,159,662. Further platinum complexes which can be used as the platinum catalyst are reaction products of chloroplatinic acid with up to 2 moles, per gram of platinum of a member selected from the class consisting of alcohols, ethers, aldehydes, and mixtures thereof, as shown in Lamoreaux, U.S. Pat. No. 3,220,972. The preferred platinum catalyst is shown by Karstedt, U.S. Pat. No. 3,775,452, which is formed by reacting chloroplatinic acid with tetramethyldivinyldisiloxane in the presence of sodium bicarbonate in an ethanol solution to form a platinum vinyldisiloxane. It has been found that effective results can be achieved if sufficient platinum catalyst is used in the silicone foamable composition to provide from 25 to 140 parts per million of platinum, preferably from 25 to 75 parts of platinum per million parts of mixture.

Component A optionally further comprises about 10 to about 100 parts by weight of a resinous copolymer selected from the group consisting of copolymers comprising $R_3{}^7SiO_{0.5}$ units and $SiO_2$ units, the ratio of $R_3{}^7SiO_{0.5}$ units to $SiO_2$ units ranging from about 0.25 to about 0.8:1, and copolymers comprising $R_3{}^7SiO_{0.5}$ units, $R_2{}^8 SiO$ units and $SiO_2$ units, where ratio of monofunctional units to tetrafunctional units is from about 0.25 to about 0.8:1 and the ratio of difunctional units to tetrafunctional units is from 0 to about 0.1:1, where $R^7$ and $R^8$ are selected from the group consisting of alkyl radicals, aryl radicals, aralkyl radicals, cycloalkyl radicals, vinyl radicals, allyl radicals and fluoroalkyl radicals. The presence of this resinous copolymer acts to lower the density and increase the strength of the foam. This copolymer is known in the art, for example, as described in U.S. Pat. No. 4,418,157 to Modic, which is incorporated by reference herein. Preferably, in the formulas provided above for the copolymer, the alkyl radicals have from 1 to 8 carbon atoms, the aralkyl from 7 to 13 carbon atoms, the cycloalkyl radicals from 6 to 8 carbon atoms and preferably the fluoroalkyl radical is 3,3,3-trifluoropropyl.

In preferred embodiments of the method of this invention, component A further contains from 1 to 200 parts by weight of part (3) a filler, per hundred parts of foam composition. It is preferred to use extending fillers or reinforcing fillers such as fumed silica. Precipitated silica can also be used in instances where it is desired to increase the physical properties such as the tensile strength and tear strength of the resulting elastomeric foam. Other extending fillers which may be utilized are, for example, titanium dioxide, lithopone, zinc oxide, zirconium silicate, silica airogel, iron oxide, diatomaceous earth, calcium carbonate, glass fibers, magnesium oxide, chromic oxide, zirconium oxide, aluminum oxide, alpha-quartz, clay, carbon and graphite. In order to minimize the viscosity increase generally experienced when using reinforcing fillers, the reinforcing fillers can be heat treated with cyclic polysiloxanes or silazanes. A preferred filler in the practice of this invention is ground quartz which has been found to enhance the burn-resistant properties of the composition as well as to impart some enhanced physical properties to the final cured silicone foam.

Component B contains about 1 to about 50 parts of a substantially linear hydride polysiloxane having the general formula (II) above. Preferably, the hydride polysiloxane consists essentially of chemically bonded organosiloxy units having silicon bonded hydrogen atoms attached to silicon to form the polysiloxane chain backbone.

The composition of this invention preferably further contains about 0.1 to about 15 parts of a cyclic hydride polysiloxane (component D) having the general formula

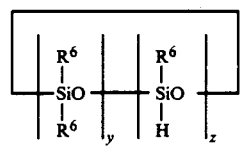

In formula (111), $R^6$ may be independently hydrogen, an alkyl radical of from 1 to 8 carbon atoms, an aryl radical from 6 to 14 carbon atoms or a haloalkyl radical of 3 to 8 carbon atoms; and y is an integer having a value of 0 to 5 inclusive, z is an integer having a value of from 1 to 8 inclusive, and the sum of y and z has a value of 3 to 8 inclusive. Preferably, the cyclic hydride polysiloxane is a hydride cyclotetrasiloxane.

It is preferred that the hydride polysiloxanes have a hydrogen content ranging from about 0.3 to about 1.6% by weight and as shown in formula (II), u and v vary to provide a viscosity ranging from 1 to 500 centipoise at 25° C. The hydride content is not critical but such a content substantially less than about 0.3% by weight of the hydride polysiloxanes may not provide sufficient hydrogen in the foamable composition to react with the hydroxy source and liberate hydrogen gas as well as react and cross-link with vinyl molecules of the vinyl containing polysiloxane. The result will of course be a poorly blown and undercured foam. Likewise, viscosity of the hydride polysiloxane is not critical, but higher viscosity materials may be difficult to obtain and utilize. Preferably, viscosity ranges from about 5 to about 250 centipoise at 25° C., and most preferably from about 5 to 100 centipoise.

The composition of the present invention further comprises about 0.1 to about 5 parts of a hydroxyl source (Component C). A hydroxyl source is necessary to properly blow the foamable composition. The source of hydroxyl may be water or organic alcohol or a mixture of water and organic alcohol. Preferred hydroxylated materials include organic alcohols which are monohydric or polyhydric alcohols having from about 1–8 carbon atoms. Preferably, there can be used methanol, ethanol, propanol, butanol, lauryl alcohol, octyl alcohol, and ethyleneglycol. The most preferred alcohol is methanol.

In forming the silicone foam, the buffer solution is added to component A and the resulting mixture is rapidly mixed with components B, C, and, if present, component D and/or any of the other optional ingredients discussed above. The resulting composition can be poured into a cavity and allowed to stand. The composition thereafter will begin to cross-link and generate gas simultaneously resulting in a cured elastomeric silicone foam.

In order that those skilled in the art will be better able to practice the present invention, the following examples are given by way of illustration and not by way of limitation. All parts are by weight.

EXPERIMENTAL

Example 1:

Synthesis of $CH_3(CH_2)_9OPO_3H_2$

Decanol (20.03 g, 0.127 moles) was added to a 300 ml three-necked round bottom flask containing a 0° C. $Et_2O$ solution (about 100 ml) of $P(O)Cl_3$ (24.23 g, 0.158 moles). These reagents were stirred overnight under a constant nitrogen sparge to remove the formed HCl from the system. The following morning a 31P NMR spectrum of the reaction mixture showed two peaks at +3.65 and +0.62 ppm which can be assigned to $POCl_2O(CH_2)_9CH_3$ and unreacted $P(O)Cl_3$ respectively. Hydrolysis of these compounds was accomplished by the addition of 250 ml of 2 $\underline{N}$ KOH to the ether solution. A second 70 ml aliquot of 2 $\underline{N}$ KOH raised the pH of the mixture to 13.2. The water layer was isolated by employing a separatory funnel. The remaining ether layer was washed three times and all aqueous portions combined. The pH of the aqueous solution was lowered to 0.5 with concentrated HCl. It is assumed that at this low pH both orthophosphoric acid and $CH_3(CH_2)_9OPO_3H_2$ exist solely as their conjugate acids. The decyl phosphoric acid ester was separated from $H_3PO_4$ by ether extraction. The ether was subsequently stripped by rotovap, leaving a white solid which was recrystallized from hexane. A melting point value of 45° C. was obtained in excellent agreement with the literature value.

Examples 2–8 and Comparative Example A

Synthesis of Silicone Foams Containing $CH_3(CH_2)_9OPO_3H_2$

All buffer solutions displayed in Table 1 were prepared by dissolving 0.201 g ($8.47 \times 10^{-5}$ mols, Examples #2–4, 6–8) or 0.456 g ($3.30 \times 10^{-4}$ mols, Example #5) of $CH_3(CH_2)_9OPO_3H_2$ in approximately 2 ml of $H_2O$ and adjusting the pH with 0.5 $\underline{N}$ KOH. These buffer solutions were transferred to 5 ml volumetric flasks and diluted to the mark with distilled $H_2O$. Modified "A" components were formulated in a 50 ml plastic beaker by blending 0.30 g of these buffer solutions with 0.897 g of a 5 wt. % solution of Pt in the form of the platinum catalyst having the formula (Pt [$(CH_2=CH)SiMe_2$]$_2O$]$_2$) and 20 g of a stock resin mixture comprised of vinyl-terminated dimethylpolysiloxane (52.2 wt. %) having a viscosity of 75,000 centipoise at 25° C., vinyl dimethyl stopped polydimethylsiloxane (19.7 wt. %) having a viscosity of 1000 centipoise at 25° C., Minusil (24.6 wt. %), and $CaCO_3$ (2.0 wt. %). The silicone foams were prepared by addition of 2.0 g of the "B" component, a mixture of vinyl-stopped siloxane polymer and methyl-hydrogen siloxane polymer, to the "A" component. The mixture was stirred rapidly for 30 seconds with a metal spatula and dispensed to a second 50 ml plastic beaker. Density measurements were made after a minimum of 3 hours.

Cure time data for Examples 2–8 and Comparative Example A are presented in Table 1 below.

TABLE 1

Silicone Foams Containing a $CH_3(CH_2)_9OPO_3H_2$/KOH Buffer System

| Example No. | pH | Cure time (min.) |
|---|---|---|
| Comp. A | control[a] | 3.0 |
| 2 | 2.20[b] | 1.5 |
| 3 | 5.92[b] | 2.5 |
| 4 | 6.66[b] | 4.0 |
| 5 | 6.74[c] | 4.0 |
| 6 | 7.25[b] | 5.0 |
| 7 | 7.72[b] | 8.0 |
| 8 | 8.11[b] | 7.5 | a. No buffer added
b. [$CH_3(CH_2)_9OPO_3H_xK_{2-x}$], (x = 0–2) In $H_2O$ = 0.169M
c. [$CH_3(CH_3)_9OPO_3H_xK_{2-x}$], (x = 0–2) in $H_2O$ = 0.38M Examples 9–15 and Comparative Example B A mixture of 200 grams of a blend was prepared containing by weight of a polydimethylsiloxane having terminal dimethylvinylsiloxy units and a viscosity of about 75,000 centistokes, 15% by weight of a polydimethylsiloxane having terminal dimethylvinylsiloxy units and a viscosity of 4000 centistokes, 18% by weight of a methylsiloxane resin consisting essentially of chemically combined $SiO_2$ in a ratio of 1.43 moles of trimethylsiloxy units, per 0.25 mole of methylvinylsiloxy units, 25% by weight of alpha-quartz, 1.5% by weight of buffered water, and 20 to 45 parts per million of platinum in the form of a platinum vinyl siloxane complex.

There was then added to the above platinum containing silicone blend, 15.0 grams of a linear hydride polysiloxane having terminal trimethylsiloxy units and consisting essentially of methyl hydrogen siloxy units and having a viscosity of about 15–40 centistokes, and 5.68 grams of a cyclic methyl hydrogen tetrasiloxane.

The hydride polysiloxane mixture was mixed with the platinum containing silicone mixture for 30 seconds and then transferred to a pre-weighed container. Foaming occurred in the resulting mixed blend.

The composition prepared in Comparative B was the same as that prepared in Examples 9–15 except that no buffer solution was used in the comparative example.

The buffering solutions used in the respective examples are indicated in Table 2 below.

TABLE 2

| Example No. | Description | pH of buffer solution |
|---|---|---|
| 9 | potassium hydrogen phthalate | 5 |
| 10 | potassium phosphate mono basic/ sodium hyroxide | 6 |
| 11 | potassium phosphate mono basic/ sodium hyroxide | 7 |

TABLE 2-continued

| Example No. | Description | pH of buffer solution |
|---|---|---|
| 12 | potassium phsophate mono basic/ sodium hydroxide | 8 |
| 13 | borax | 9 |
| 14 | sodium bicarbonate/ sodium carbonate | 10 |
| 15 | sodium bicarbonate/ sodium carbonate plus 335g of 10 minusil | 10 |
| Comp. B | deionized water - not buffered | — |

Rise time was selected as a measure of cure time in Examples 9-15 and Comparative Example B. The rise time of the foams prepared in Examples 9-15 and Comparative Example B were measured and are presented in Table 3 below.

TABLE 3

| Example No. | pH of Buffer Solution | Rise Time (min) |
|---|---|---|
| 9 | 5 | 13.0 |
| 10 | 6 | 12.5 |
| 11 | 7 | 15.0 |
| 12 | 8 | 17.25 |
| 13 | 9 | 15.5 |
| 14 | 10 | 22.0 |
| 15 | 10 | 20.5 |
| Comp. B | — | 13.5 |

The data shown in Table 3 reveals a general trend wherein rise time and therefore cure time increases as the pH of the buffer solution and consequently the pH of the composition is increased.

Examples 16-21 and Comparative Example C

To the compositions of Examples 9-15 and Comparative Example B were added 10 g of Minusil (ground quartz). The rise times were measured and are presented in Table 4 below.

TABLE 4

| Examples 16-22 and Comparative Example B | | |
|---|---|---|
| Example No. | pH of Buffer | Rise Time (Min.) |
| 16 | 5 | 18.0 |
| 17 | 6 | 15.0 |
| 18 | 7 | 17.0 |
| 19 | 8 | 23.0 |
| 20 | 9 | 27.0 |
| 21 | 10 | 39.0 |
| Comp. B | deionized H₂O | 24.15 |

The data presented in Table 4 indicate that a further and more constant increase in rise time can be achieved by using filler in addition to the buffer solution.

What is claimed is:

1. A method for controlling the cure time of a silicone foamable composition comprising by weight:
   (A) a silicone composition comprising by weight:
      (1) 100 parts of a a vinyl-terminated polydiorganosiloxane of the formula:

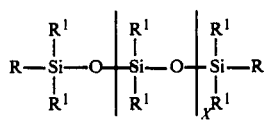

wherein R and $R^1$ are selected from the group consisting of substituted or unsubstituted hydrocarbon radicals of from 1 to 20 carbon atoms, such that the polymer contains from 0.0002 to 3% by weight vinyl and x varies such that the viscosity of the polymer varies from 100 to 1,000,000 centipoise at 25° C.;
   (2) about 25 to about 140 parts per million of a platinum catalyst;
   (3) about 1 to 200 parts by weight of a reinforcing or extending filler per hundred parts of foamable composition;
(B) 1 to 50 parts of a substantially linear hydride polysiloxane having the formula

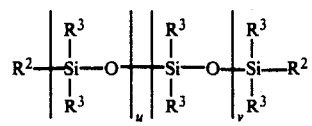

wherein $R^2$ is selected independently from the group consisting of hydrogen, alkyl radicals of from 1 to 8 carbon atoms, halo substituted alkyl radicals of from 1 to 8 carbon atoms, aryl radicals of from 6 to 14 carbon atoms, and halo substituted aryl radicals of from 6 to 14 carbon atoms; and $R^3$ is selected from the group consisting of alkyl radicals of from 1 to 8 carbon atoms, aryl radicals of from 6 to 14 carbon atoms, halo aryl radicals of from 6 to 14 carbon atoms, and fluoroalkyl radicals of from 3 to 8 carbon atoms; u and v are integers which can vary sufficiently to provide a hydride polysiloxane having a viscosity of from about 5 to about 10,000 centipoise at 25° C.; and
(C) about 0.1 to about 5 parts of a hydroxyl source selected from the group consisting of water, organic alcohol, or a mixture of the foregoing; comprising the step of adding to the composition about 1 to about 5 parts by weight of an aqueous buffer solution having a pH of about 2 to about 10, wherein cure time is increased if the pH of the buffer solution is higher than the pH of the composition prior to the addition thereto of the buffer solution, and wherein cure time is decreased if the pH of the buffer solution is lower than the pH of the composition prior to the addition thereto of the buffer solution.

2. A method according to claim 1 wherein the silicone foamable composition further comprises by weight about 0.1 to about 15 parts of a cyclic hydride polysiloxane having the formula.

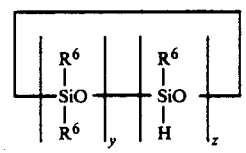

wherein $R^6$ may be independently hydrogen, an alkyl radical of from 1 to 8 carbon atoms, an aryl radical from 6 to 14 carbon atoms or a haloalkyl radical of 3 to 8 carbon atoms; and y is an integer having a value of 0 to 5 inclusive, z is an integer having a value of from 1 to 8 inclusive, and the sum of y and z has a value of 3 to 8 inclusive.

3. A method according to claim 2 wherein the cyclic hydride polysiloxane is a hydride cyclotetrasiloxane.

4. A method according to claim 1 wherein the silicone foamable composition further comprises about 10 to about 100 parts by weight of a resinous copolymer selected from the group consisting of copolymers comprising $R_3^7SiO_{0.5}$ units and $SiO_2$ units, the ratio of $R_3^7SiO_{0.5}$ units to $SiO_2$ units ranging from about 0.25 to about 0.8:1, and copolymers comprising $R_3^7SiO_{0.5}$ units, $R_2^8$ SiO units and $SiO_2$ units, where the ratio of monofunctional units to tetrafunctional units is from about 0.25 to about 0.8:1 and the ratio of difunctional units to tetrafunctional units is from 0 to about 0.1:1, where $R^7$ and $R^8$ are selected from the group consisting of alkyl radicals, aryl radicals, aralkyl radicals, cycloalkyl radicals, vinyl radicals, allyl radicals and fluoroalkyl radicals.

5. A method according to claim 1 wherein the vinyl terminated polydiorganosiloxane is a vinyl terminated polydimethylsiloxane.

6. A method according to claim 1 wherein the hydroxyl source is an alcohol.

7. A method according to claim 6 wherein the alcohol is an alkanol having 1 to about 8 carbon atoms.

8. A method according to claim 7 wherein the alkanol is a methanol.

9. A method according to claim 8 wherein the platinum catalyst is a platinum vinyldisiloxane.

10. A method according to claim 1 wherein the buffer solution used to obtain a pH value in the range of about 2 to about 8 is an aqueous phosphoric acid ester/potassium hydroxide buffer, wherein the phosphoric acid ester has the formula $$R^3OPO_3H_2$$

wherein $R^3$ is a substituted or unsubstituted alkyl radical having about 1 to about 20 carbon atoms or a substituted or unsubstituted aryl radical having 6 to about 20 carbon atoms.

11. A method for increasing the cure time of a silicone foamable composition comprising by weight:
(A) a silicone composition comprising by weight:
(1) 100 parts of a a vinyl-terminated polydiorganosiloxane of the formula:

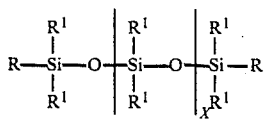

wherein R and $R^1$ are selected from the group consisting of substituted or unsubstituted hydrocarbon radicals of from 1 to 20 carbon atoms, such that the polymer contains from 0.0002 to 3% by weight vinyl and x varies such that the viscosity of the polymer varies from 100 to 1,000,000 centipoise at 25° C.;
(2) about 25 to about 140 parts per million of a platinum catalyst;
(3) about 1 to 200 parts by weight of a reinforcing or extending filler per hundred parts of foamable composition;
(B) 1 to 50 parts of a substantially linear hydride polysiloxane having the formula

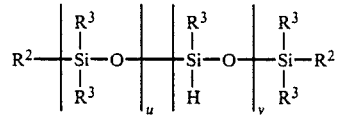

wherein $R^2$ is selected independently from the group consisting of hydrogen, alkyl radicals of from 1 to 8 carbon atoms, halo substituted alkyl radicals of from from 1 to 8 carbon atoms, aryl radicals of from 6 to 14 carbon atoms, and halo substituted aryl radicals of from 6 to 14 carbon atoms; and $R^3$ is selected from the group consisting of alkyl radicals of from 1 to 8 carbon atoms, aryl radicals of from 6 to 14 carbon atoms, halo aryl radicals of from 6 to 14 carbon atoms, and fluoroalkyl radicals of from 3 to 8 carbon atoms; u and v are integers which can vary sufficiently to provide a hydride polysiloxane having a viscosity of from about 5 to about 10,000 centipoise at 25° C.; and
(C) about 0.1 to about 5 parts of a hydroxyl source selected from the group consisting of water, organic alcohol, or a mixture of the foregoing;
comprising the step of adding to the composition about 1 to about 5 parts by weight of an aqueous buffer solution having a pH of about 2 to about 10, with the proviso that the pH of the buffer solution is higher than the pH of the composition prior to the addition thereto of the buffer solution.

12. A method according to claim 11 wherein the pH of the buffer solution is about 8 to about 10.

13. A method according to claim 12 wherein the pH of the buffer solution is about 10.

14. A method according to claim 11 wherein the silicone foamable composition further comprises by weight about 0.1 to about 15 parts of a cyclic hydride polysiloxane having the general formula:

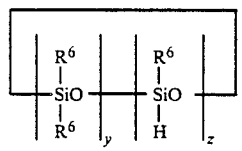

wherein $R^6$ may be independently hydrogen, an alkyl radical of from 1 to 8 carbon atoms, an aryl radical from 6 to 14 carbon atoms or a haloalkyl radical of 3 to 8 carbon atoms; and y is an integer having a value of 0 to 5 inclusive, z is an integer having a value of from 1 to 8 inclusive, and the sum of y and z has a value of 3 to 8 inclusive.

15. A method according to claim 14 wherein the cyclic hydride polysiloxane is a hydride cyclotetrasiloxane.

16. A method according to claim 11 wherein the silicone foamable composition further comprises about 10 to about 100 parts by weight of a resinous copolymer selected from the group consisting of copolymers comprising $R_3^7SiO_{0.5}$ units and $SiO_2$ units, the ratio of $R_3^7SiO_{0.5}$ units to $SiO_2$ units ranging from about 0.25 to about 0.8:1, and copolymers comprising $R_3^7SiO_{0.5}$ units, $R_2^8$ SiO units and $SiO_2$ units, where the ratio of monofunctional units to tetrafunctional units is from about 0.25 to about 0.8:1 and the ratio of difunctional units to tetrafunctional units is from 0 to about 0.1:1, where R[7] and R[8] are selected from the group consisting of alkyl radicals, aryl radicals, aralkyl radicals, cycloalkyl radicals, vinyl radicals, allyl radicals and fluoroalkyl radicals.

17. A method according to claim 11 wherein the vinyl terminated polydiorganosiloxane is a vinyl terminated polydimethylsiloxane.

18. A method according to claim 11 wherein the hydroxyl source is an alcohol.

19. A method according to claim 18 wherein the alcohol is an alkanol having 1 to about 8 carbon atoms.

20. A method according to claim 19 wherein the alkanol is a methanol.

21. A method according to claim 20 wherein the platinum catalyst is a platinum vinyldisiloxane.

22. A method according to claim 11 wherein the buffer solution used to obtain a pH value in the range of about 6 to about 8 is an aqueous phosphoric acid ester/potassium hydroxide buffer, wherein the phosphoric acid ester has the formula $$R^3OPO_3H_2$$

wherein $R^3$ is a substituted or unsubstituted alkyl radical having about 1 to about 20 carbon atoms or a substituted or unsubstituted aryl radical having 6 to about 20 carbon atoms.

23. A method for decreasing the cure time of a silicone foamable composition comprising by weight:
(A) an aqueous phase comprising by weight:
  (1) 100 parts of a vinyl-terminated polydiorganosiloxane of the formula:

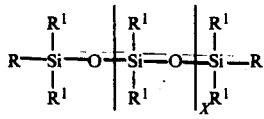

wherein R and $R^1$ are selected from the group consisting of substituted or unsubstituted hydrocarbon radicals of from 1 to 20 carbon atoms, such that the polymer contains from 0.0002 to 3% by weight vinyl and x varies such that the viscosity of the polymer varies from 100 to 1,000,000 centipoise at 25° C.;
  (2) about 25 to about 140 parts per million of a platinum catalyst;
  (3) about 1 to 200 parts by weight of a reinforcing or extending filler per hundred parts of foamable composition;
(B) 1 to 50 parts of a substantially linear hydride polysiloxane having the formula

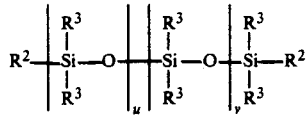

wherein $R^2$ is selected independently from the group consisting of hydrogen, alkyl radicals of from 1 to 8 carbon atoms, halo substituted alkyl radicals of from 1 to 8 carbon atoms, aryl radicals of from 6 to 14 carbon atoms, and halo substituted aryl radicals of from 6 to 14 carbon atoms; and $R^3$ is selected from the group consisting of alkyl radicals of from 1 to 8 carbon atoms, aryl radicals of from 6 to 14 carbon atoms, halo aryl radicals of from 6 to 14 carbon atoms, and fluoroalkyl radicals of from 3 to 8 carbon atoms; u and v are integers which can vary sufficiently to provide a hydride polysiloxane having a viscosity of from about 5 to about 10,000 centipoise at 25° C.; and
(C) about 0.1 to about 5 parts of a hydroxyl source selected from the group consisting of water, organic alcohol, or a mixture of the foregoing;
comprising the step of adding to the composition about 1 to about 5 parts by weight of an aqueous buffer solution having a pH of about 2 to about 10, with the proviso that the pH of the buffer solution is lower than the pH of the composition prior to the addition thereto of the buffer solution.

24. A method according to claim 23 wherein the silicone foamable composition further comprises by weight about 0.1 to about 15 parts of a cyclic hydride polysiloxane having the formula:

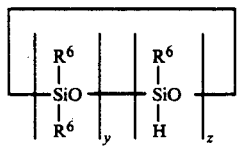

wherein $R^6$ may be independently hydrogen, an alkyl radical of from 1 to 8 carbon atoms, an aryl radical from 6 to carbon atoms or a haloalkyl radical of 3 to 8 carbon atoms; and y is an integer having a value of 0 to 5 inclusive, z is an integer having a value of from 1 to 8 inclusive, and the sum of y and z has a value of 3 to 8 inclusive.

25. A method according to claim 24 wherein the cyclic hydride polysiloxane is a hydride cyclotetrasiloxane.

26. A method according to claim 25 wherein the silicone foamable composition further comprises about 10 to about 100 parts by weight of a resinous copolymer selected from the group consisting of copolymers comprising $R_3^7SiO_{0.5}$ units and $SiO_2$ units, the ratio of $R_3^7SiO_{0.5}$ units to $SiO_2$ units ranging from about 0.25 to about 0.8:1, and copolymers comprising $R_3^7SiO_{0.5}$ units, $R_2^8SiO$ units and $SiO_2$ units where the ratio of monofunctional units to tetrafunctional units is from about 0.25 to about 0.8:1 and the ratio of difunctional units to tetrafunctional units is from 0 to about 0.1:1, where $R^7$ and $R^8$ are selected from the group consisting of alkyl radicals, aryl radicals, aralkyl radicals, cycloalkyl radicals, vinyl radicals, allyl radicals and fluoroalkyl radicals.

27. A method according to claim 23 wherein the vinyl terminated polydiorganosiloxane is a vinyl terminated polydimethylsiloxane.

28. A method according to claim 27 wherein the hydroxyl source is an alcohol.

29. A method according to claim 28 wherein the alcohol is an alkanol having 1 to about 8 carbon atoms.

30. A method according to claim 29 wherein the alkanol is a methanol.

31. A method according to claim 23 wherein the platinum catalyst is a platinum vinyldisiloxane.

32. A method according to claim 23 wherein the buffer solution used to obtain a pH value in the range of about 2 to about 8 is an aqueous phosphoric acid ester/- potassium hydroxide buffer, wherein the phosphoric acid ester has the formula $$R^3OPO_3H_2$$

wherein $R^3$ is a substituted or unsubstituted alkyl radical having about 1 to about 20 carbon atoms or a substituted or unsubstituted aryl radical having 6 to about 20 carbon atoms.

* * * * *

UNITED STATES PATENT AND TRADEMARK OFFICE
CERTIFICATE OF CORRECTION

PATENT NO. : 4,983,641

DATED : January 8, 1991

INVENTOR(S) : David C. Gross, Donald S. Johnson, and Connie H. Shannon

It is certified that error appears in the above-identified patent and that said Letters Patent is hereby corrected as shown below:

column 4, lines 66-68 and continuing onto column 5, line 1, please delete the sentence "Most phenyl radicals, vinyl radicals and 3,3,3-trifluoropropyl radicals where the polymer has the foregoing vinyl substitution and R is vinyl."

Signed and Sealed this

Twenty-fourth Day of November, 1992

Attest:

DOUGLAS B. COMER

Attesting Officer

Acting Commissioner of Patents and Trademarks